Patented Jan. 26, 1954

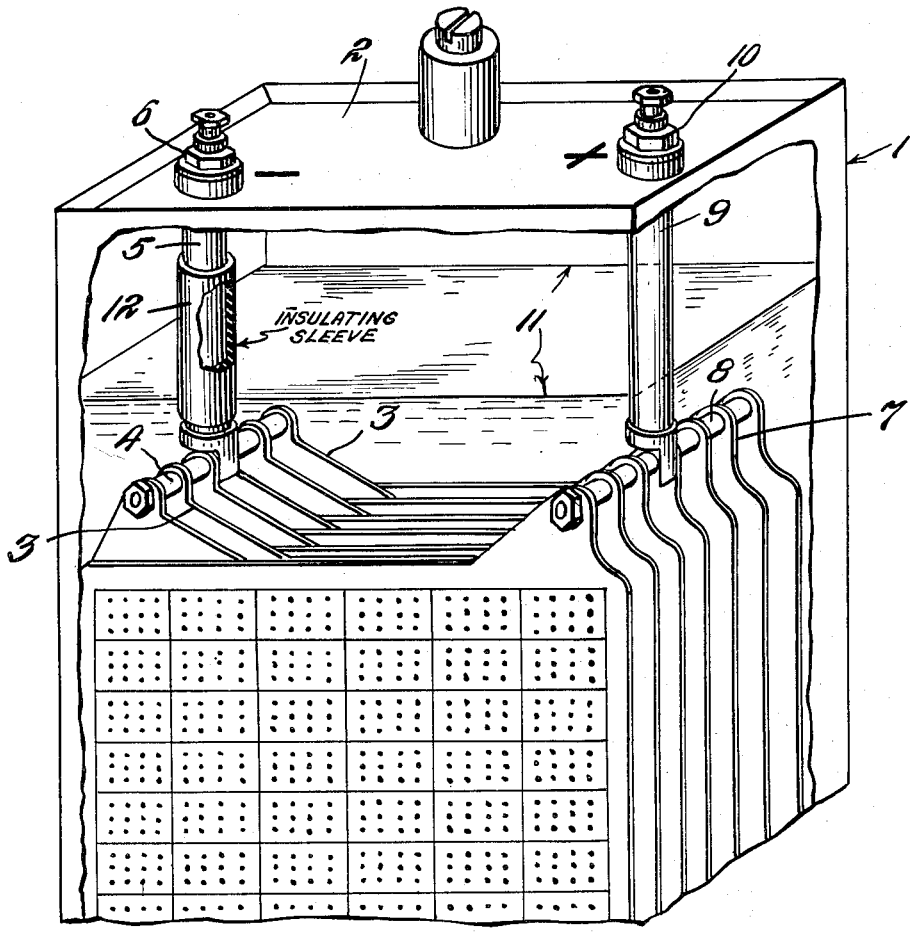

2,667,525

UNITED STATES PATENT OFFICE 2,667,525

ALKALINE STORAGE BATTERY

Paul Hersch, Birmingham, England, assignor to The International Nickel Company, Inc., New York, N. Y., a corporation of Delaware Application December 6, 1951, Serial No. 260,277

Claims priority, application Great Britain December 20, 1950

3 Claims. (Cl. 136—9)

The present invention relates to improvements in electrical storage batteries and, more particularly, to storage or secondary batteries having alkaline electrolytes.

It is well known that storage batteries with alkaline electrolytes have the objectionable characteristic of discharging rather quickly when standing in open circuit from which there results a considerable loss of charge during periods of non-use. This objection is peculiarly related to electrical storage or secondary batteries, i. e., batteries in which the galvanic action takes place reversibly as distinguished from primary batteries in which the galvanic action is irreversible. The objectionable loss of charge is particularly severe and of a substantial degree when storage batteries have alkaline electrolytes, with which the present invention is concerned. In these batteries, there is a negative mass which acts as the anode on discharge and which as a rule is either iron (partly in the form of the oxide or hydroxide or both) or cadmium (in the form of the oxide or hydroxide or both). The negative mass is commonly carried in plates suspended from a common bar which in turn is carried by one or more supports (usually a single rod) descending from the cover of the battery and furnished with a terminal connection. A positive mass, which acts as the cathode on discharge, is carried in similarly supported plates interleaved with the negative plates and is usually nickel hydrate, though it may consist of various other substances, e. g., cobalt hydrate or silver oxide. In any case, there are both positive and negative supports which extend downward into the electrolyte which commonly is a caustic potash solution; and the negative and positive masses are wholly immersed in the electrolyte.

Although it has been well known that storage batteries with alkaline electrolytes suffer from the disadvantage that they discharge rather quickly during periods of non-use and when in open circuit, no attempts to overcome this difficulty, as far as I am aware, were successful when carried into practice commercially on an industrial scale.

The present invention is based on the discovery that a substantial part of this discharge is caused by electrochemical action which results in oxidation of the negative mass, particularly when this consists of iron, and that this electrochemical action is itself mainly caused by the ionization of atmospheric oxygen at the place where the electrolyte meets both the atmosphere and the metallic supports, i. e., at the water line. In effect, it was found that the water line is a powerful cathode.

It is an object of the present invention to provide alkaline storage batteries or accumulators having structurally incorporated therewith non-conducting insulating means positioned to exclude or to prevent contact of the electrolyte with the support for the negative mass at the position of the upper surface of the electrolyte or at the water line.

Another object of the invention is to provide an electrical storage battery with an alkaline accumulator of the type in which the negative plates are suspended by a bar carried by a supporting rod (or rods) wherein such rod is surrounded by a non-conducting insulating sleeve or layer so as to exclude the electrolyte from contact with the rod at the water line to prevent loss of charge by electrochemical action where the electrolyte meets both the atmosphere and the metallic supports.

It is likewise within the contemplation of the invention to provide a storage battery having an alkaline electrolyte, having negative plates suspended by a bar carried by a supporting rod, and employing the improved feature of an insulating sleeve enclosing the supporting rod, and having a close fit and positioned to exclude the electrolyte from contact with the rod at the water line, said insulating sleeve being, for example, ebonite or polystyrene.

Other objects and advantages of the present invention will become apparent from the following description taken in conjunction with the accompanying drawing wherein there is shown a perspective view of a storage battery structure, with portions broken away for purposes of clarity, embodying the features of my present invention in preferred form.

Generally speaking, the present invention contemplates employing an electrical storage battery structure with an alkaline electrolyte in which negative plates are carried by supports extending above the water line and improved by the provision of an insulating member or sleeve positioned so as to exclude the electrolyte from contact with the rod at the water line. In consequence, the small closed circuit set up by electrochemical action where the electrolyte meets both the atmosphere and the metallic support is interrupted and the discharge of the battery resulting therefrom is eliminated.

In carrying the invention into practice, the negative plates are suspended by a bar carried by a supporting rod, as illustrated in the drawing;

and the insulating feature of the invention is incorporated by the employment of a closely fitting insulating sleeve fitted to the supporting rod and positioned at the water line to extend slightly above and below the water line to accommodate for normal variables in the water level. This insulating sleeve is desirably made of an insulating material inert to a caustic potash solution, which is the electrolyte most commonly used, and, for example, may be made of ebonite or polystyrene.

For the purpose of giving those skilled in the art a better understanding of the invention, reference is made to the drawing wherein the storage battery has a casing composed of a rectangular frame 1 with glass sides and lid-like top or cover member 2. Negative plates 3 are carried by a bar 4 which is fixed to the bottom of a rod 5, the upper end of which is secured to pass through an opening in the top 2 and is provided with the usual terminal contact 6. Positive plates 7 are similarly carried by a bar 8 and a rod 9 having an externally positioned terminal contact 10. The two supporting rods 5 and 9 in accordance with customary storage battery construction pass through the surface of the electrolyte shown at 11. In the preferred embodiment of the invention, the rod 5 supporting and connected to the negative plates is closely surrounded by an insulating sleeve 12 of a length such that whatever the normal fluctuations in the level of the surface of the electrolyte the rod 5 is not exposed to the atmosphere at this surface.

The present invention is particularly applicable to storage batteries employing an alkaline electrolyte which are highly susceptible to loss of charge when standing unused. The employment of the insulating sleeve in the manner illustrated functions to interrupt the closed circuit leakage as set up by the electrochemical action. It has been found that by reason of the employment of the insulating sleeve of the invention, as much as fifty per cent of the total loss of charge experienced in conventional nickel-iron alkaline batteries standing unused can be prevented.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a nickel-iron alkaline electrical storage battery having electrodes, an alkaline electrolyte and conductive supports for the electrodes consisting of bars carried by conducting supporting rods extending upwardly from below the electrolyte surface level, the improvement consisting of an insulating sleeve of a material inert to the electrolyte closely surrounding the supporting rod for the negative electrodes and constructed and arranged to intersect and extend through the normal surface levels of the electrolyte and to exclude contact of the electrolyte with the supporting rod of the negative electrodes at the region of the upper surface level of the electrolyte, thereby opposing open circuit discharge of the battery incident to the electrochemical action at the surface level of the electrolyte.

2. In a nickel-iron alkaline electrical storage battery having electrodes, a caustic potash electrolyte and conductive supports for the electrodes consisting of bars carried by conducting supporting rods extending upwardly from below the electrolyte surface level, the improvement consisting of an insulating sleeve of a material inert to the electrolyte, said sleeve closely surrounding the supporting rod for the negative electrodes and constructed and arranged to intersect and extend through the normal surface levels of the electrolyte and to exclude contact of the electrolyte with the supporting rod of the negative electrodes at the region of the upper surface level of the electrolyte, thereby opposing open circuit discharge of the battery incident to electrochemical action at the surface level of the electrolyte.

3. In a nickel-iron alkaline storage battery having electrodes, an alkaline electrolyte and conductive supports for the electrodes consisting of bars carried by conducting supporting rods extending upwardly from below the electrolyte surface level, the improvement consisting of an insulating sleeve of ebonite, said insulating sleeve closely surrounding the supporting rod for the negative electrodes only and constructed and arranged to intersect and extend through the normal surface levels of the electrolyte and to exclude contact of the electrolyte with the supporting rod of the negative electrodes at the region of the upper surface level of the electrolyte, thereby opposing open circuit discharge of the battery incident to electrochemical action where the electrolyte meets both the atmosphere and the metallic support for the negative electrodes.

PAUL HERSCH.

References Cited in the file of this patent

FOREIGN PATENTS

| Number | Country | Date |
|---|---|---|
| 1,890 of 1901 | Great Britain | Nov. 30, 1901 |
| 324,981 | Great Britain | Feb. 10, 1930 |
| 181,815 | Germany | Oct. 25, 1904 |